US008649805B2

(12) United States Patent
Ruckart et al.

(10) Patent No.: US 8,649,805 B2
(45) Date of Patent: *Feb. 11, 2014

(54) METHODS, SYSTEMS AND COMPUTER PROGRAM PRODUCTS FOR TAILORING ADVERTISEMENTS TO A USER BASED ON ACTIONS TAKEN USING A PORTABLE ELECTRONIC DEVICE

(75) Inventors: John Ruckart, Atlanta, GA (US); Robert Starr, Decatur, GA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/601,039

(22) Filed: Aug. 31, 2012
(Under 37 CFR 1.47)

(65) Prior Publication Data

US 2013/0006755 A1    Jan. 3, 2013

Related U.S. Application Data

(63) Continuation of application No. 12/504,877, filed on Jul. 17, 2009, now Pat. No. 8,280,408.

(51) Int. Cl.
*H04W 24/00* (2009.01)

(52) U.S. Cl.
USPC .............. 455/456.3; 455/414.1; 455/438; 455/404.2; 455/456.2; 725/10; 725/42; 725/35; 725/46; 705/14.45; 705/14.49; 370/338

(58) Field of Classification Search
USPC ........ 455/438, 456.3, 404.2, 405, 414.1, 466, 455/436, 456.1; 705/14.45, 14.49; 725/10, 725/42, 35, 46; 370/328–338
See application file for complete search history.

(56) References Cited

U.S. PATENT DOCUMENTS

| 5,983,270 | A | 11/1999 | Abraham |
| 7,151,926 | B2 | 12/2006 | Prehofer |
| 7,483,964 | B1 | 1/2009 | Jackson |
| 8,280,408 | B2* | 10/2012 | Ruckart et al. ............. 455/456.3 |
| 8,433,611 | B2* | 4/2013 | Lax et al. .................... 705/14.4 |
| 2002/0166119 | A1 | 11/2002 | Cristofalo |
| 2004/0192310 | A1 | 9/2004 | Karaoguz |
| 2004/0203602 | A1* | 10/2004 | Karaoguz et al. ............. 455/411 |
| 2005/0166240 | A1 | 7/2005 | Kim |
| 2006/0133414 | A1 | 6/2006 | Luoma et al. |
| 2006/0271934 | A1 | 11/2006 | Ezaki |
| 2007/0264969 | A1 | 11/2007 | Frank |
| 2008/0086370 | A1* | 4/2008 | Narayanaswami et al. ..... 705/14 |

(Continued)

*Primary Examiner* — Mahendra Patel
*Assistant Examiner* — Quan M Hua
(74) *Attorney, Agent, or Firm* — Guntin & Gust, PLC; Andrew Gust

(57) ABSTRACT

A method of advertising tailored based on usage patterns of a portable electronic device includes determining if a portable electronic device has entered an area associated with a local area network (LAN). A link is established between the portable electronic device and the LAN if it is determined that the portable electronic device has entered the area associated with the LAN. User services are established between the portable electronic device and a remote server using the established link based on a user profile associated with the portable electronic device. Devices associated with the remote server communicatively coupled to the LAN are controlled using the portable electronic device. Actions and/or behaviors of a user are tracked based on use of the portable electronic device. Advertisements are displayed and/or played on at least one of the controlled devices based on the tracked user actions and/or behaviors.

20 Claims, 8 Drawing Sheets

(56) References Cited

U.S. PATENT DOCUMENTS

| | | | |
|---|---|---|---|
| 2008/0092159 A1* | 4/2008 | Dmitriev et al. | 725/34 |
| 2008/0244148 A1 | 10/2008 | Nix, Jr. et al. | |
| 2008/0250445 A1* | 10/2008 | Zigmond et al. | 725/32 |
| 2010/0093333 A1* | 4/2010 | Friedenthal et al. | 455/418 |
| 2011/0013604 A1 | 1/2011 | Ruckart | |
| 2011/0014928 A1 | 1/2011 | Ruckart | |

* cited by examiner

METHODS, SYSTEMS AND COMPUTER PROGRAM PRODUCTS FOR TAILORING ADVERTISEMENTS TO A USER BASED ON ACTIONS TAKEN USING A PORTABLE ELECTRONIC DEVICE

CROSS-REFERENCE TO RELATED APPLICATIONS

This application is a continuation of and claims priority to U.S. patent application Ser. No. 12/504,877 filed Jul. 19, 2009, which is incorporated herein by reference in its entirety.

BACKGROUND

The present disclosure generally relates to the field of communications and, more particularly, to communications using portable electronic devices.

A wide variety of communications services are available for users. For example, the use of mobile phones having the capability to communicate using multiple types of services, for example, cellular, Wi-fi, femtocell and the like, which are becoming widely available. As ownership of these devices becomes more wide spread, the demand for services for these devices may be in demand.

BRIEF DESCRIPTION OF THE DRAWINGS

Other features of the present disclosure will be more readily understood from the following detailed description of exemplary embodiments thereof when read in conjunction with the accompanying drawings, in which.

DETAILED DESCRIPTION

Figure 1:
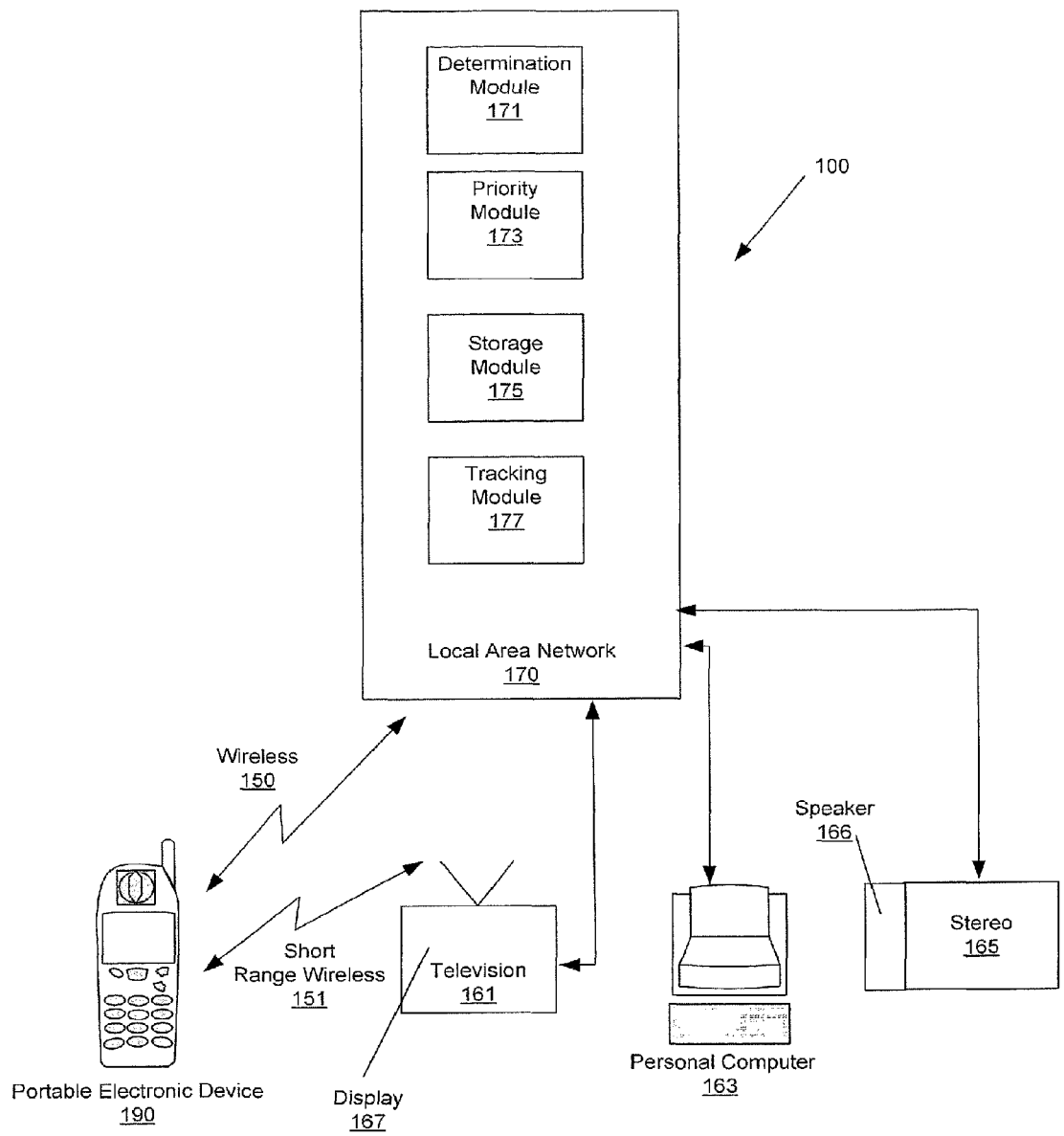
FIG. 1 is a block diagram of a system including a portable electronic device suitable for use in some embodiments.

The present disclosure will be described more fully hereinafter with reference to the accompanying figures, in which embodiments are shown. This disclosure may, however, be embodied in many alternate forms and should not be construed as limited to the embodiments set forth herein.

Accordingly, while the disclosure is susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure as defined by the claims. Like numbers refer to like elements throughout the description of the figures.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to another element, there are no intervening elements present. As used herein the term "and/or" includes any and all combinations of one or more of the associated listed items and may be abbreviated as "/".

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure. Although some of the diagrams include arrows on communication paths to show a primary direction of communication, it is to be understood that communication may occur in the opposite direction to the depicted arrows.

Example embodiments are described below with reference to block diagrams and/or flowchart illustrations of methods, devices, systems and/or computer program products. It is understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the functions/acts specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, example embodiments may be implemented in hardware and/or in software (including firmware, resident software, micro-code, etc.). Furthermore, example embodiments may take the form of a computer program product comprising a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of data processing systems discussed herein may be written in a high-level programming language, such as Java, AJAX (Asynchronous JavaScript), C, and/or C++, for development convenience. In addition, computer program code for carrying out operations of example embodiments may also be written in other programming languages, such as, but not limited to, interpreted languages. Some modules or routines may be written in assembly language or even micro-code to enhance performance and/or memory usage. However, embodiments are not limited to a particular programming language. It will be further appreciated that the functionality of any or all of the program modules may also be implemented using discrete hardware components, one or more application specific integrated circuits (ASICs), or a programmed digital signal processor or microcontroller.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated.

For purposes of illustration and explanation only, various embodiments are described herein in the context of a portable electronic device, specifically a mobile terminal It will be understood, however, that the present disclosure is not limited to such embodiments and may be embodied generally in any device that is capable of performing operations in accordance with some embodiments of the present disclosure.

As discussed above, portable electronic devices, for example, portable electronic devices having both a cellular transceiver and a short range transceiver are currently available and will likely be more prevalent in years to come. Accordingly, some embodiments discussed herein allow customers to use their portable electronic device to connect and control devices, such as a television or set-top-box, digital video recorder (DVR), audio system and/or personal computer (PC) using their local area network (LAN). For example, portable electronic devices could be configured to provide basic remote control capabilities and web access for more functionality of their services and applications. As discussed further herein, the portable electronic device may store at least one user profile that may include items such as settings, favorites, digital media rights and "single-sign-on" information that could be used with any compliant device. The compliant device may not even be located in the user's home, for example, hotel televisions, hotel stereos, and the like may also be within the scope of the present application. Multiple portable electronic devices may be present within an area covered by a single LAN and each could interface with devices based on an administrative hierarchy as will be discussed further below with respect to FIGS. 1 through 8.

Furthermore, according to some embodiments service providers may also track the actions and/or behaviors of individual users associated with the portable electronic devices and this information can be used for targeted advertising. Details with respect to advertising are discussed further herein.

Some embodiments provide methods of tailoring advertising based on usage patterns of a portable electronic device including determining if a portable electronic device has entered an area associated with a local area network (LAN). A link is established between the portable electronic device and the LAN if it is determined that the portable electronic device has entered the area associated with the LAN. User services are established between the portable electronic device and a remote server using the established link based on a user profile associated with the portable electronic device. Devices associated with the remote server communicatively coupled to the LAN are controlled using the portable electronic device. Actions and/or behaviors of a user are tracked based on use of the portable electronic device. Advertisements are displayed and/or played on at least one of the controlled devices based on the tracked user actions and/or behaviors.

In further embodiments of the present disclosure, the tracked actions and/or behaviors of the user may be stored and the stored tracked actions and/or behaviors may be analyzed to identify interests of the user. In certain embodiments, the identified interests may be matched to advertisements associated with the identified interests. The matched advertisements may be transmitted to at least one of the controlled devices for display and/or playback at the at least one of the controlled devices.

In still further embodiments of the present disclosure, the user's response to the matched advertisements may be obtained and stored. The stored tracked actions and/or behaviors of the user may be reanalyzed with the stored user's responses to identify refined interests of the user. The refined interests of the user may be matched to advertisements associated with the refined interests of the user. The advertisements associated with the refined interests of the user may be displayed or played. The reanalyzing and matching may be repeatedly reanalyzed to further refine the advertisements displayed and/or played to the user.

Although primarily method embodiments have been discussed above, system and computer program product embodiments are also provided herein.

Other systems, methods, and/or computer program products according to embodiments will be or become apparent to one with skill in the art upon review of the following drawings and detailed description. It is intended that all such additional systems, methods, and/or computer program products be included within this description, be within the scope of the present disclosure, and be protected by the accompanying claims.

Referring first to FIG. 1, a system 100 in accordance with some embodiments may include a portable electronic device 190, a local area network (LAN) 170 and a plurality of devices associated with the LAN, such as television 161, personal computer 163 and stereo 165. Although embodiments of the present disclosure illustrated in FIG. 1 include a single portable electronic device 190, a single LAN 170 and three devices 161, 163 and 165, embodiments are not limited to this configuration. Any number of these devices or additional devices may be included without departing from the scope of the present disclosure.

As used herein, the term "portable electronic device" includes: a cellular radiotelephone with or without a multi-line display; a Personal Communications System (PCS) terminal that combines a cellular radiotelephone with data processing, facsimile and data communications capabilities; a Personal Data Assistant (PDA) that includes a radiotelephone, pager, Internet/intranet access, Web browser, organizer, calendar and/or a global positioning system (GPS) receiver; a gaming device, an audio video player, and a conventional laptop and/or palmtop portable computer that includes a radiotelephone transceiver. Any portable electronic device capable of operating in accordance with some embodiments may be used without departing from the scope of the present disclosure.

Referring again to FIG. 1, a wireless connection is established between the LAN 170 and the portable electronic device 190. The wireless connection 150 can be any type of wireless connection without departing from the scope of the present disclosure. The LAN 170 may also communicate with the devices, for example, television 161, personal computer 163 and stereo 165, through the network. It will be understood that although not shown in FIG. 1, a remote server, for example, an Internet server, may be positioned between the LAN 170 and the devices 161, 163 and 165. As further illustrated in FIG. 1, the portable electronic device 190 may communicate with the devices 161, 163 and 165 directly over a short range link 151, for example, a Wi-fi link, a bluetooth connection or the like. Thus, in some embodiments, the portable electronic device 190 may be used to control the devices 161, 163 and 165.

It will be understood that the wireless connection may also be established using femtocells without departing from the scope of embodiments discussed herein. Femtocells are small cellular base stations, typically designed for use in residential or small business environments. The femtocell connects to the service provider's network via a broadband connection, such as a digital subscriber link (DSL) or cable. Current designs can typically support from about 5 to about 200 portable electronic devices in a residential setting. A femtocell may allow service providers to extend service coverage indoors, especially where access would otherwise be limited or unavailable. The femtocell incorporates the functionality of a typical base station, but extends it to allow a simpler, self-contained deployment; an example is a UMTS femtocell containing a Node B, RNC and GSN with Ethernet for backhaul. Although much attention is focused on UMTS, the concept is applicable to all standards, including GSM, CDMA2000, TD-SCDMA and WiMAX solutions.

As further illustrated in FIG. 1, the LAN 170 may include a determination module 171, a priority module 173, a storage module 175 and a tracking module 177, which may be configured to implement various aspects of the embodiments discussed herein. Although the determination module 171, the priority module 173, storage module 175 and the tracking module 171 are illustrated in FIG. 1 as being part of the LAN, embodiments are not limited to this configuration. For example, these modules may be present in the portable electronic device 190 or in a remote server without departing from the scope of embodiments discussed herein. Also, these modules may be integrated in the same component or included in different components.

Figure 2:
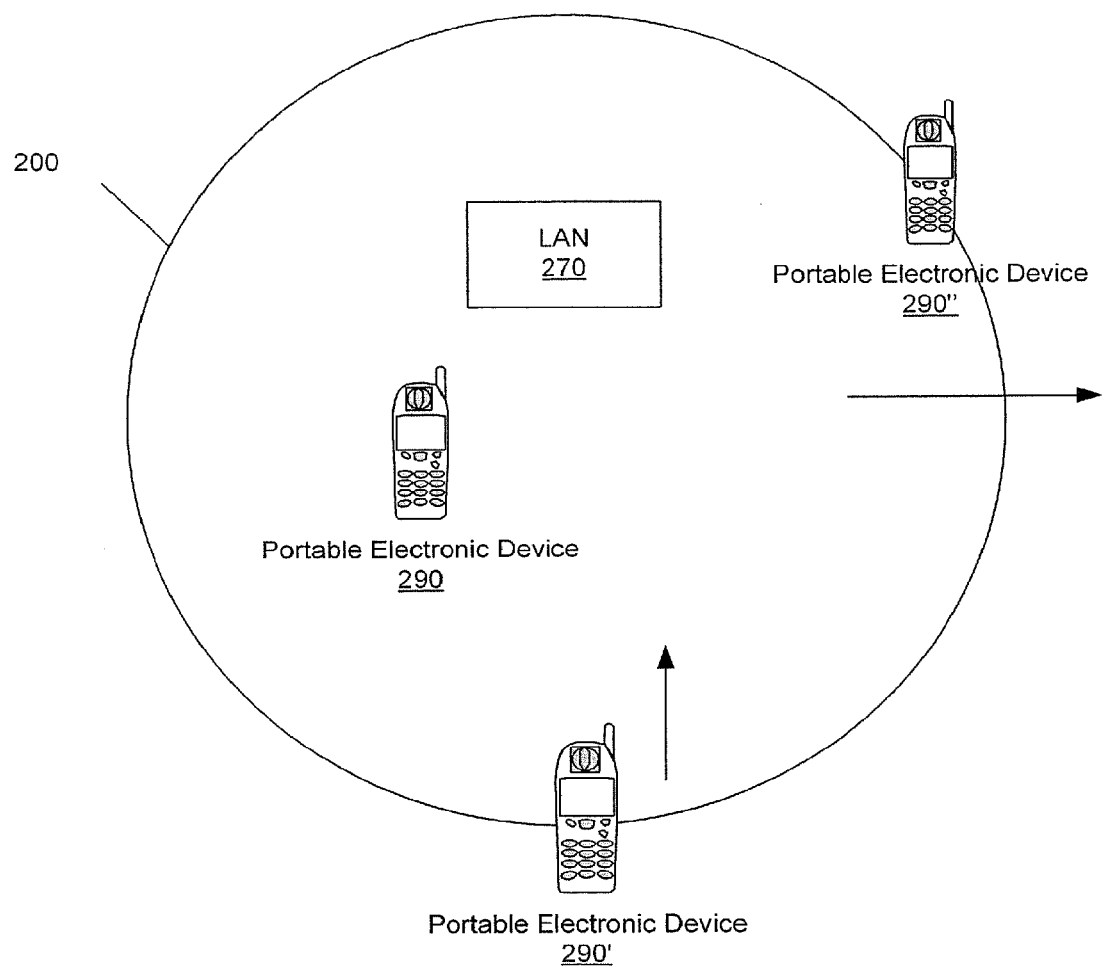
FIG. 2 is a block diagram of a system including multiple portable electronic devices according to some embodiments.

Referring now to FIG. 2, a block diagram illustrating a system including multiple portable electronic devices 290, 290' and 290" in accordance with some embodiments will be discussed. As illustrated in FIG. 2, an area 200 associated with a LAN 270 is defined and various portable electronic devices are depicted either entering 190', in 190 or exiting 190 the area 200 associated with the LAN.

Figure 3:
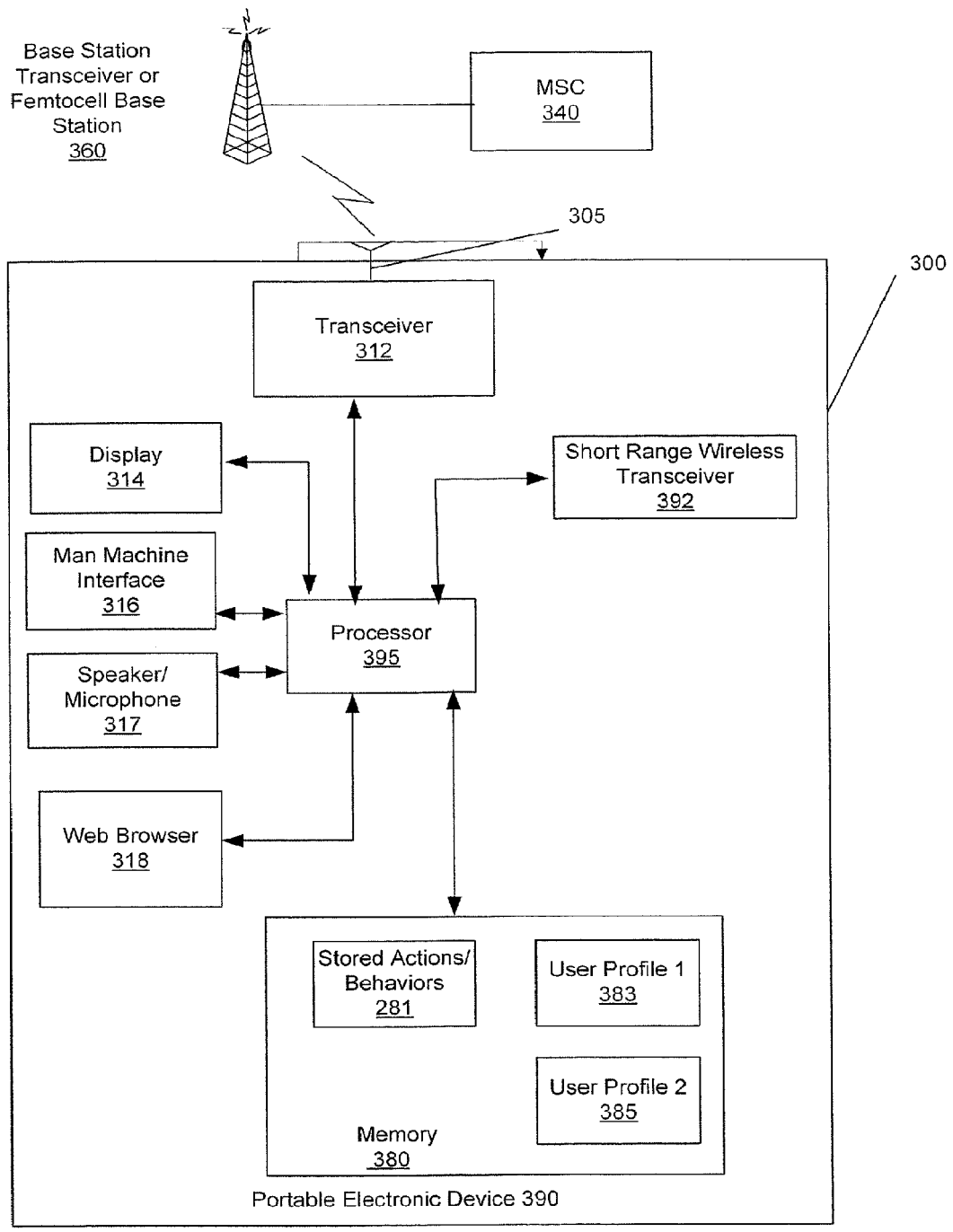
FIG. 3 is a block diagram illustrating a portable electronic device and base station transceiver according to some embodiments.

Portable electronic devices in accordance with some embodiments are illustrated in more detail in FIG. 3. The portable electronic devices 190, 290, 290' and 290" of FIGS. 1 and 2 may include the details of the portable electronic device 390 discussed with respect to FIG. 3. As illustrated in FIG. 3, the portable electronic device 390 includes a portable housing 300 and may include a display 314, a man machine interface (MMI) 316, a speaker/microphone 317, a web browser 318, a transceiver 312 and a memory 380, any of which may communicate with a processor 395. Furthermore, portable electronic devices 390 according to embodiments may further include a short range transceiver 392 according to some embodiments, which also communicates with the processor 395. The processor 395 can be any commercially available or custom microprocessor.

As illustrated, the memory 380 may store one or more user profiles 383 and 385 associated with the portable electronic device 390 and user actions/behaviors 381 associated with the portable electronic device 390. It will be understood that although only two user profiles and one user actions/behaviors file are shown in the memory 380, embodiments are not limited to this configuration. For example, one or more than two user profiles may be present without departing from the scope of embodiments discussed herein.

It will be understood that the user actions/behaviors may be stored at the portable electronic device 390 at the LAN 190, 290 in the storage module 175 or at both locations without departing from the scope of embodiments discussed herein.

As further illustrated in FIG. 3, the portable electronic device 390 communicates with a base station transceiver 360 connected to a mobile switching center ("MSC") 340 in accordance with some embodiments. The transceiver 312 typically includes a transmitter circuit and a receiver circuit, which respectively transmit outgoing radio frequency signals to the base station transceiver 360 and receive incoming radio frequency signals, such as voice and data signals, from the base station transceiver 360 via an antenna 305. The antenna 305 may be an embedded antenna, a retractable antenna or any antenna known to those having skill in the art without departing from the scope of the present disclosure. The radio frequency signals transmitted between the portable electronic device 390 and the base station transceiver 360 may include both traffic and control signals (e.g., paging signals/messages for incoming calls), which are used to establish and maintain communication with another party or destination. The processor 395 may support various functions of the portable electronic device including methods, systems and computer program products in accordance with some embodiments discussed herein.

As discussed above, the portable electronic device 390 also includes a short range transceiver 392. The short range transceiver 392 may be, for example, a Bluetooth transceiver, which may allow for high transfer rates of data over relatively short distances.

In some embodiments, the base station transceiver 360 includes the radio transceiver(s) that defines an individual cell in a cellular network and communicates with the portable electronic device 390 and other portable electronic devices in the cell using a radio-link protocol. Although only a single base station transceiver 360 is shown, it will be understood that many base station transceivers may be connected through, for example, a mobile switching center 340 and other devices to define a wireless communications network.

It will be further understood that one or more of the base stations 360 can be a femtocell, which is a small cellular base station. The femtocell connects to the service provider's network via broadband connection. A femtocell allows service providers to extend service coverage indoors, especially where access would otherwise be limited or unavailable. The femtocell incorporates the functionality of a typical base station but extends it to allow a simpler, self-contained deployment.

Although exemplary embodiments may be implemented in communication devices or systems, such as the portable electronic device 390, the present disclosure is not limited to such devices and/or systems. Instead, the present disclosure may be embodied in any apparatus that may be configured to operate in accordance with some embodiments.

Exemplary operations in accordance with some embodiments will now be discussed with respect to FIGS. 1 through 3. The determination module 171 may be configured to determine if a portable electronic device 190, 290, 290', 290" and 390 (collectively "190") has entered an area 200 associated with the LAN 170, 270. In some embodiments, if a portable electronic device 190 is determined to have entered the area 200 associated with the LAN 170, 270, the determination module 171 may be further configured to prompt a user of the portable electronic device for a form of identification for security purposes. For example, the user may be prompted for a login, a password, a biometric or the like. If the form of identification is valid, i.e. satisfied a satisfies a security rule such as login provided=login stored and password provided=password stored, the LAN 170, 270 may establish a link between the portable electronic device 190 and the LAN 170, 270.

Once this link is established, the LAN 170, 270 may establish services between the portable electronic device 190 and a remote server (not shown) associated with devices 161, 163 and 165 using the established link based on a user profile associated with the portable electronic device 190. The user profile may be stored at the LAN by the storage module 175, at the portable electronic device in memory 380 as user profile 1 or user profile 2 or both without departing from the scope of the present disclosure. The user profile may include, for example, user persona information, user customization information, digital rights information associated with the portable electronic device and/or a user of the portable electronic device, subscription information, digital video recorder (DVR) information, hierarchical user information and/or control settings.

In particular, the portable electronic device 190 may be configured to transmit the user profile associated with the portable electronic device 190 to the LAN 170, 270 over the established link. The LAN 170, 270 may be configured to receive the transmitted user profile at the LAN 170, 270 over the established link and transmit the received user profile to a remote server (not shown). The remote server (not shown) is configured to receive the transmitted user profile. User services are established between the portable electronic device 190 and the remote server based on the transmitted user profile. Thus, a user may use the portable electronic device 190 to control devices 161, 163 and 165 associated with the remote server communicatively coupled to the LAN 170, 270. For example, the portable electronic device 190 may use the short range transceiver 392 to access the television 161 and control the volume, channel and the like. Similarly, the portable electronic device may be used to control other devices such as a DVR, play, fast forward, rewind and the like.

As discussed above, more than one portable electronic device 190 may be present in the area 200 associated with the LAN 270 as illustrated in FIG. 2. The determination module 171 may be further configured to determine if a second portable electronic device 290' has entered the area associated with the LAN 270. As discussed above, once the determination module 171 verifies that the user is a valid user via login, password or the like, a second link between the second portable electronic device 290' and the LAN 270 may be established. User service are established between the second portable electronic device 290' and the remote server (not shown) using the second established link based on a second user profile associated with the second portable electronic device 290. At this point, the priority module is configured to establish a priority between the first 290 and second 290' portable electronic devices based on hierarchical user information in the first and second user profiles. For example, parent/child hierarchies, administrator/user hierarchies and the like. This can be customized by the user. The first 290 and second 290' portable electronic devices are then configured to control devices 161, 163 and 165 associated with the remote server communicatively coupled to the LAN 270 based on the established priority.

In some embodiments, the determination module 171 may be configured to detect that the portable electronic device 290" is no longer within the area 200 associated with the LAN 270. In particular, as illustrated in FIG. 2, the portable electronic device 290" is exiting the area 200 as indicated by the arrow pointing out of the area. The LAN 270 is configured to terminate the established link between the portable electronic device 290" and the LAN 270 based on detection of the portable electronic device 290" exiting the area. At this point, the portable electronic device 290" may be configured to operate using a cellular system discussed above. In some embodiments of the present disclosure, the tracking module 177 may be configured to track actions and/or behaviors of a user based on use of the portable electronic device 190. A display 167 and/or speaker 166 associated with at least one of the controlled devices 161, 163 and 165 may be configured to display and/or play advertisements on at least one of the controlled devices 161, 163 and 165 based on the tracked user actions and/or behaviors. It will be understood that the advertisements may be displayed on and/or played through the portable electronic device without departing from the scope of embodiments discussed herein.

The tracking module 177 may be further configured to store the tracked actions and/or behaviors of the user in the storage module 175 and/or the user actions/behaviors 181 and analyze the stored tracked actions and/or behaviors to identify interests of the user. For example, if the user of the portable electronic device 190 continually accesses a web site dedicated to sports and, in particular, hockey, the tracking module may identify sports-hockey as an interest of the user.

The tracking module 177 may be further configured to match the identified interests to advertisements associated with the identified interests. For example, the sports-hockey interest of the user may cause the tracking module 177 to identify hockey advertisements for games, events and the like. Then, the tracking module 177 may be configured to transmit the matched advertisements to one or more of the controlled devices for display (on display 167) and/or playback (on speaker 165) at the one or more of the controlled devices.

In some embodiments, the tracking module 177 may be further configured to obtain the user's response to the matched advertisements and store the user's response to the matched advertisements with the tracked actions and/or behaviors of the user at the storage module 175 and/or in the actions/behaviors 181. The tacking module 177 may be configured to analyze the stored tracked actions and/or behaviors of the user with the stored user's responses to identify refined interests of the user. The refined interests of the user may be matched to advertisements associated with the refined interests of the user. The advertisements associated with the refined interests of the user may be displayed on display 167 or played on speaker 166.

In accordance with some embodiments, the advertisements provided to the one or more controlled devices may be continually refined by repeatedly reanalyzing and matching as discussed above.

Figure 4:
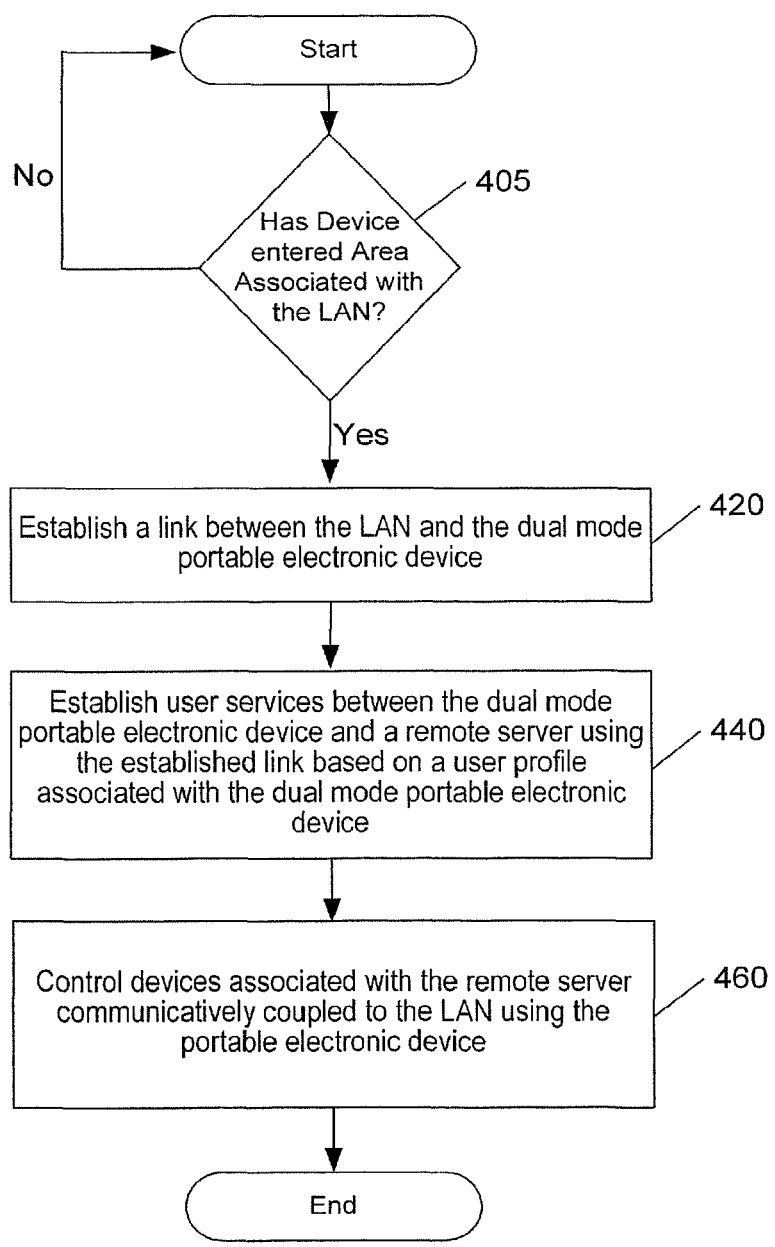
FIGS. 4 through 8 are flowcharts illustrating operations according to various embodiments.

Referring now to FIGS. 4 through 8, operations according to various embodiments will be discussed. Referring first to FIG. 4, methods of managing remote devices using a portable electronic device begin at block 405 by determining if a portable electronic device has entered an area associated with a local area network (LAN). If no portable electronic device is detected (block 405), operations terminate until a device is detected. If, on the other hand, a portable electronic device is detected, a link between the portable electronic device and the LAN is established (block 420). User services are established between the portable electronic device and a remote server using the established link based on a user profile associated with the portable electronic device (block 440). The user profile may include user persona information, user customization information, digital rights information associated with the portable electronic device and/or a user of the portable electronic device, subscription information, digital video recorder (DVR) information and/or control settings. Devices associated with the remote server communicatively coupled to the LAN may be controlled using the portable electronic device (block 460). The controlled devices may be devices such as a television, digital video recorder (DVR), audio system and/or personal computer. For example, the portable electronic device may be used as a remote control for a television.

Figure 5:
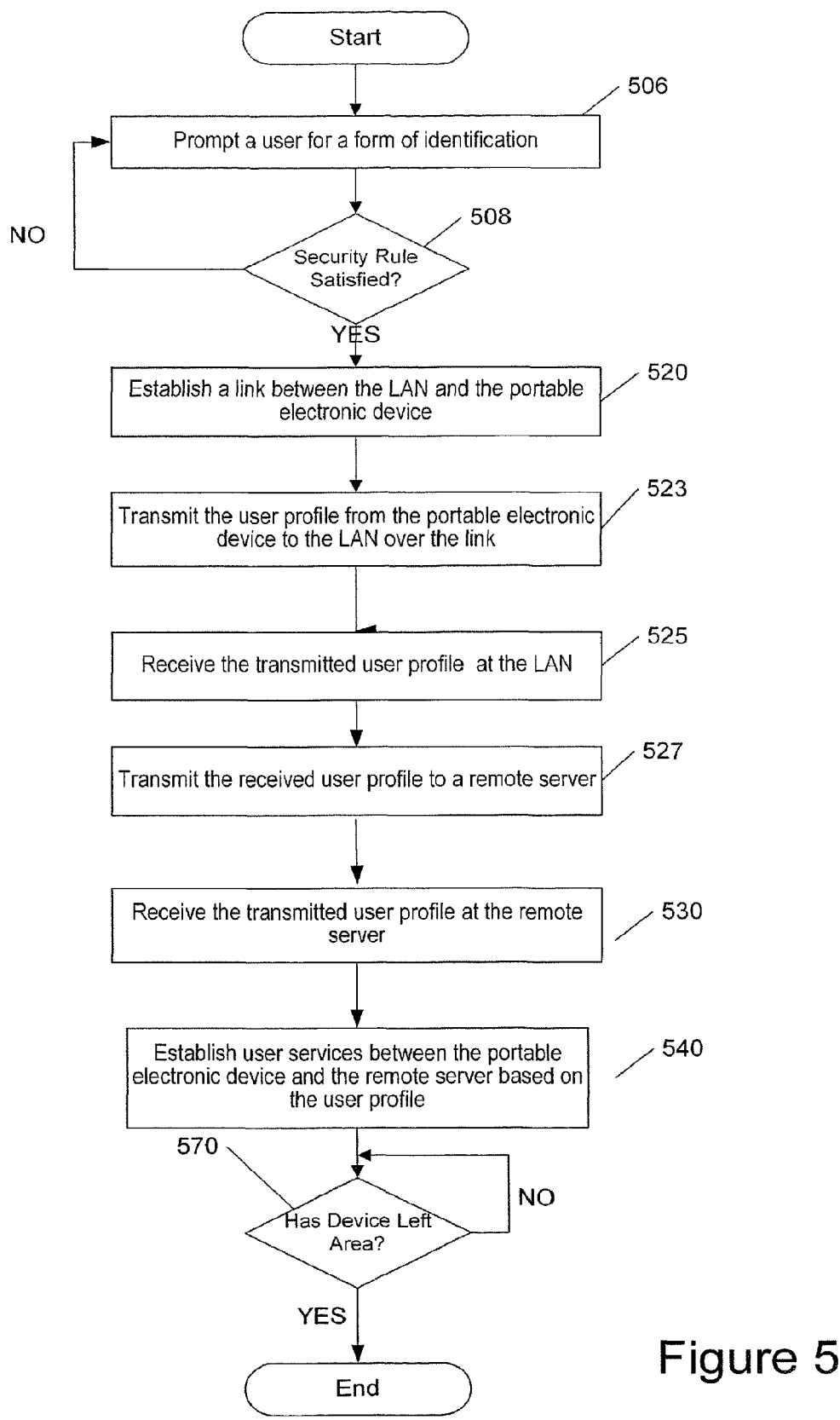

Referring now to FIG. 5, once a portable electronic device is detected, the user may be prompted for a form of identification for security purposes (block 506). It is determined if the security rule is satisfied (block 508). If the security rule has not been satisfied (block 508), operations return to block 506 and await another form of identification. If, on the other hand, the security rule is satisfied (block 508), a link may be established between the portable electronic device and the LAN (block 520).

The user profile associated with the portable electronic device may be transmitted to the LAN over the established link (block 523). The transmitted user profile may be received at the LAN over the established link (block 525). The received user profile may be transmitted to a remote server (block 527). The transmitted user profile may be received at the remote server (block 530). User services may be established between the portable electronic device and the remote server based on the transmitted user profile (block 540).

It may be determined if the portable electronic device has exited the area associated with the LAN (block 570). If it is determined that the device has exited the area (block 570), the established link may be terminated and operations may cease. If, on the other hand, it is determined that the device has not exited the area (block 570), operations remain at block 570 until it is determined that the device has exited the area or has been powered off.

Figure 6:
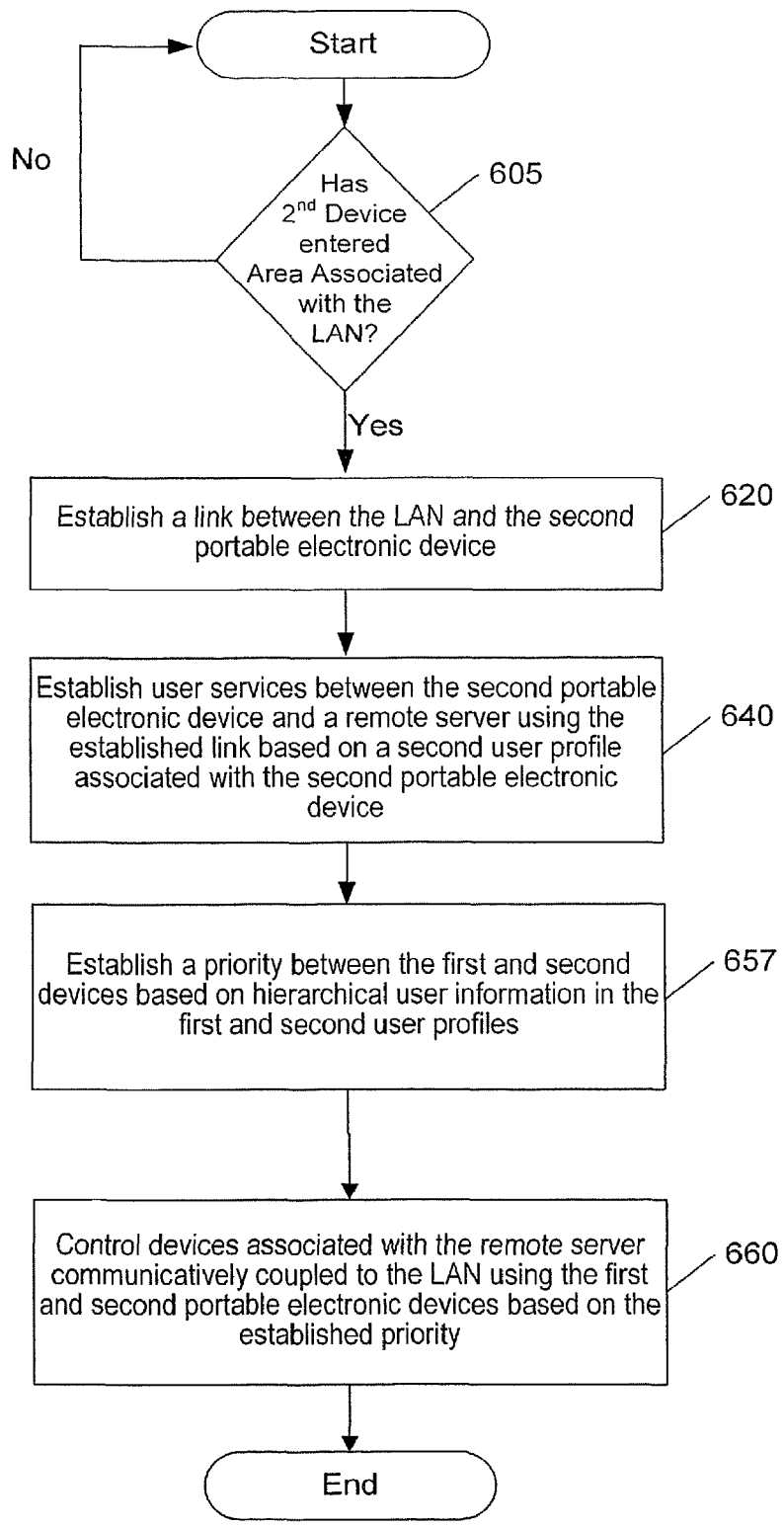

Referring now to FIG. 6, operations with respect to multiple portable electronic devices will be discussed. Assuming that a first portable electronic device is already present in the area associated with the LAN, it is determined if a second portable electronic device has entered the area associated with the LAN (block 605). If it is determined that a second portable electronic device has not entered the area (block 605), operations remain at block 605 until a second device is detected. If, on the other hand, it is determined that a second portable electronic device has entered the area (block 605), a second link between the second portable electronic device and the LAN may be established (block 620).

User services between the second portable electronic device and the remote server may be established using the established second link based on a second user profile associated with the second portable electronic device (block 640). A priority between the first and second portable electronic devices may be established based on hierarchical user information in the first and second user profiles (block 657). The devices associated with the remote server communicatively coupled to the LAN may be controlled using the first and second portable electronic devices based on the established priority (block 660).

Figure 7:
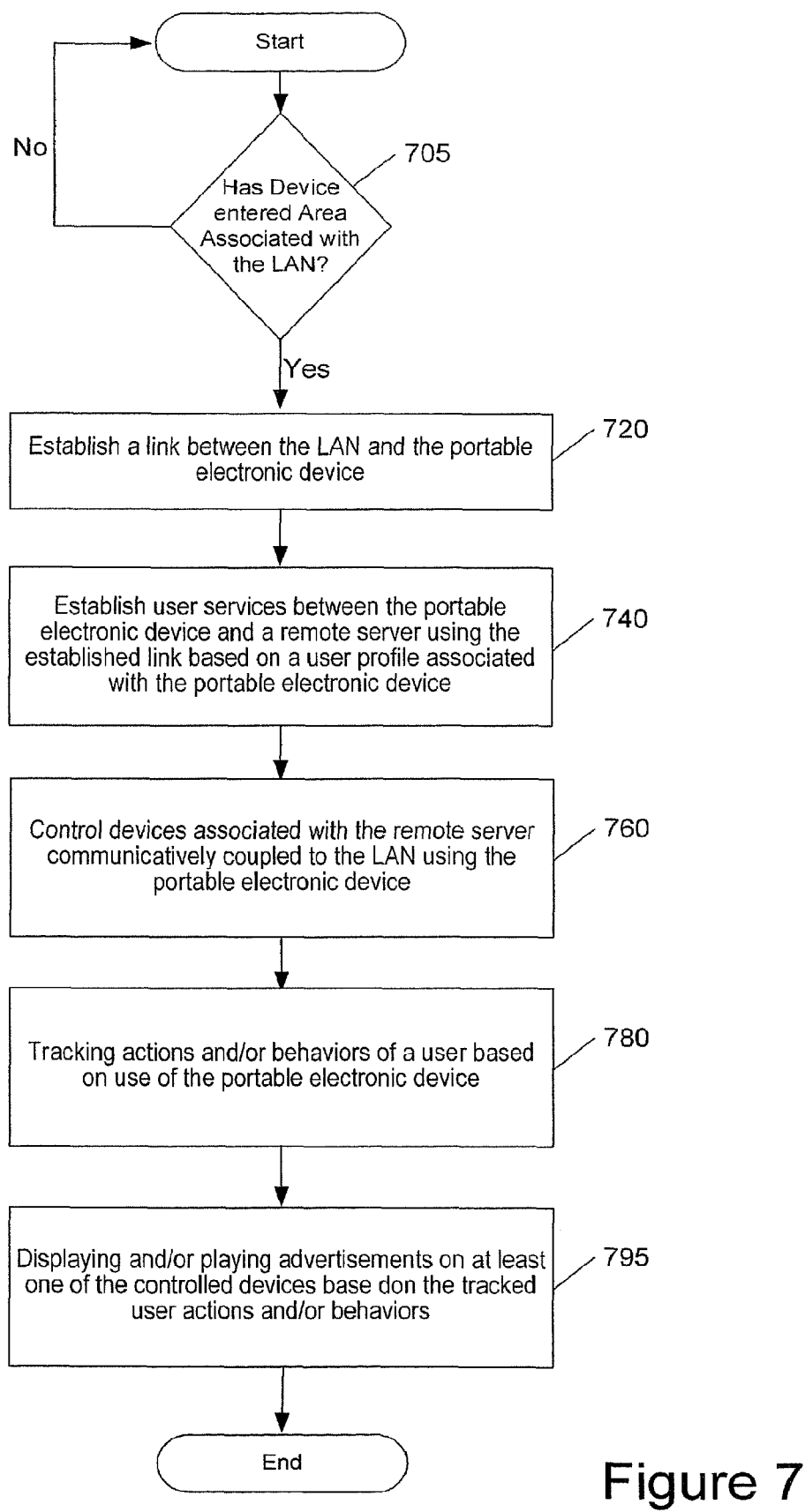

Referring now to FIG. 7, methods of tailoring advertising based on usage patterns of a portable electronic device begin at block 705 by determining if a portable electronic device has entered an area associated with a local area network (LAN). If it is determined that a portable electronic device has not entered the area associated with the LAN (block 705), operations remain at block 705 until it is determined that a portable electronic device has entered the area associated with the LAN. If, on the other hand, it is determined that a portable electronic device has entered the area associated with the LAN (block 705), a link between the portable electronic device and the LAN may be established (block 720). User services are established between the portable electronic device and a remote server using the established link based on a user profile associated with the portable electronic device (block 740). Devices associated with the remote server communicatively coupled to the LAN may be controlled using the portable electronic device (block 760).

Actions and/or behaviors of the user may be tracked based on use of the portable electronic device (block 780). For example, where the user is calling, what web sites the user accesses, what television shows the user records and the like. Advertisements may be displayed and/or played on at least one of the controlled devices based on the tracked user actions and/or behaviors (block 795).

Figure 8:
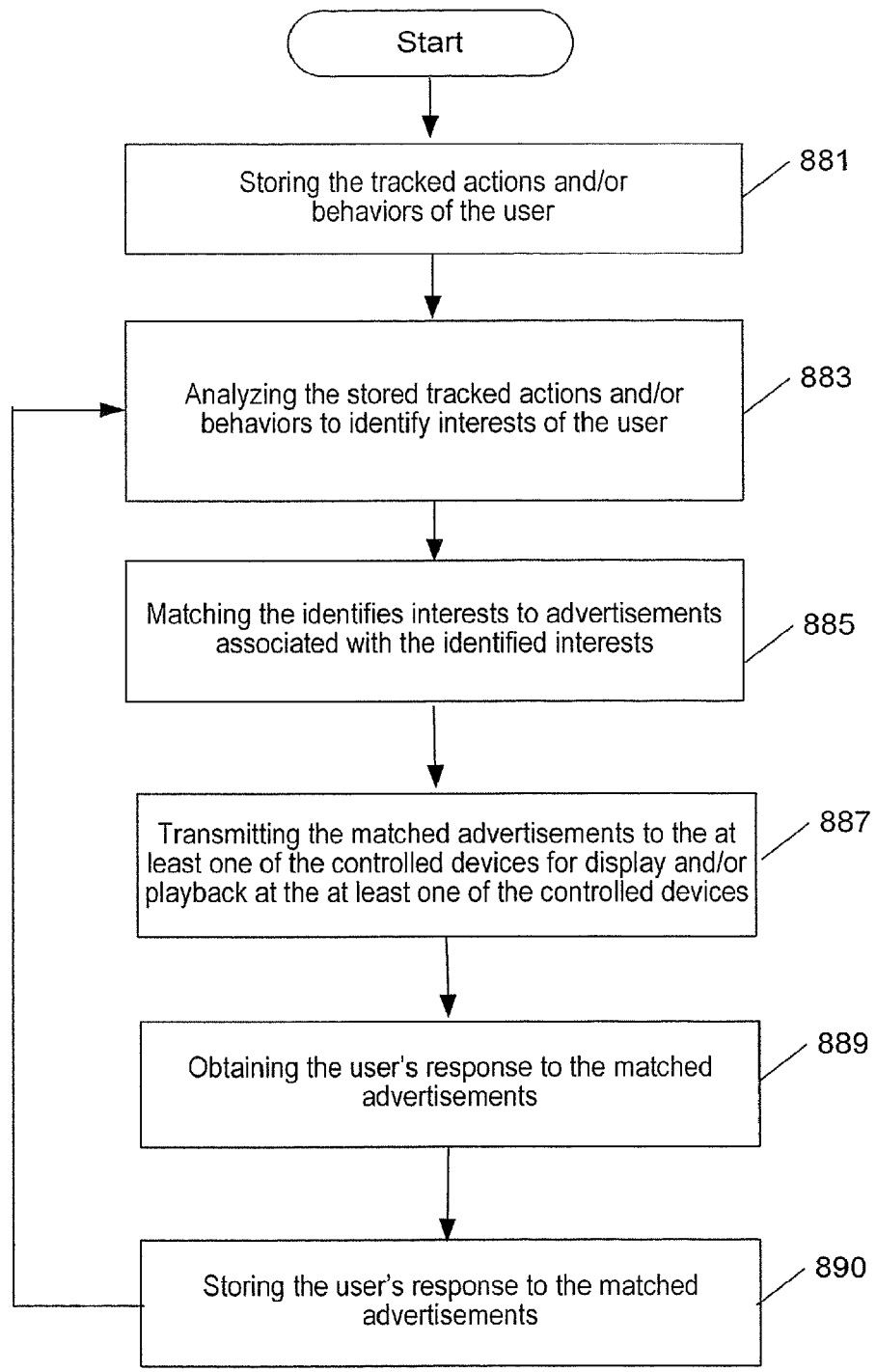

Details with respect to tracking user behaviors and/or actions will be discussed with respect to the flowchart of FIG. 8. As illustrated in FIG. 8, operations begin at block 881 by storing the tracked actions and/or behaviors of the user. The stored tracked actions and/or behaviors may be analyzed to identify interests of the user (block 883). The identified interests of the user may be matched to advertisements associated with the identified interests (block 885). The matched advertisements may be transmitted to at least one of the controlled devices for display and/or playback at the at least one of the controlled devices (block 887). User responses to the matched advertisements may be obtained (block 889) and stored with the tracked actions and/or behaviors of the user (block 890).

Once the user responses have been obtained and stored, operations may return to block 883 where the stored tracked actions and/or behaviors of the user are reanalyzed with the stored user's responses to identify refined interests of the user. The operations proceed to block 885 where the refined interests of the user are matched to advertisements associated with the refined interests of the user. The advertisements associated with the refined interests of the user may be displayed or played to the user (block 795, FIG. 7). As indicated by the arrow from block 890 to block 883 of FIG. 8, the reanalyzing and the matching may be continually repeated to further refine the advertisements displayed and/or played to the user.

As briefly discussed above with respect to FIGS. 1 through 8, some embodiments provide portable electronic devices configured to connect to both a LAN and local devices and may be used to control local devices such as a television or stereo. Use of the portable electronic device in accordance with some embodiments of the present disclosure may allow a user to reduce the number of devices in his/her possession.

As further discussed above, the user's actions and/or behaviors associated with portable electronic devices in accordance with some embodiments may be tracked and stored. The stored user actions and/or behaviors may be used to tailor advertisements to be displayed to the user on the portable electronic device or one of the controlled devices associated with the LAN.

In the drawings and specification, there have been disclosed exemplary embodiments of the disclosure. However, many variations and modifications can be made to these embodiments without substantially departing from the principles of the present disclosure. Accordingly, although specific terms are used, they are used in a generic and descriptive sense only and not for purposes of limitation, the scope of the disclosure being defined by the following claims.

What is claimed is:

1. A method comprising:
receiving, by a system comprising a processor, a user profile associated with a portable electronic device via a communication link that is established with the portable electronic device responsive to a presence of the portable electronic device in an area of a local area network;
facilitating, by the system, user services between the portable electronic device and the system according to the user profile associated with the portable electronic device;
facilitating, by the system, control, by the portable electronic device, of a controllable device associated with the system and coupled to the local area network;
tracking, by the system, actions associated with utilization of the portable electronic device via the communication link to identify interests associated with a user of the portable electronic device;
identifying, by the system, first advertisements to be presented by the controllable device based on the interests that are identified;
detecting, by the system, a response from the portable electronic device to a presentation of one of the first advertisements;
reanalyzing, by the system, the actions that are tracked in conjunction with the response to identify refined interests associated with the user;
matching, by the system, the refined interests to second advertisements;
presenting, by the system, the second advertisements by way of the controllable device; and
terminating, by the system, the communication link with the portable electronic device responsive to determining that the portable electronic device is outside the area associated with the local area network.

2. The method of claim 1, wherein the user profile comprises one of digital rights information associated with the portable electronic device; digital rights information associated with the user; subscription information; digital video recorder information; hierarchical user information; control settings; or combinations thereof.

3. The method of claim 2, further comprising:
wherein a second communication link is established between the system and a second portable electronic device responsive to a determination that the second portable electronic device has entered the area associated with the local area network, and further comprising establishing, by the system, other communication services between the second portable electronic device and the system using the second communication link based on a second user profile associated with the second portable electronic device.

4. The method of claim 3, wherein the controllable device is controllable by the portable electronic device or by the second portable electronic device according to hierarchal user information obtained from the user profile or the second user profile.

5. The method of claim 1, wherein the portable electronic device is a cellular radio telephone.

6. The method of claim 1, wherein the controllable device is one of a television or a stereo.

7. The method of claim 1, wherein the actions that are trcked comprise accessing a website via the portable electronic device.

8. A server comprising:
a memory to store instructions; and
a processor coupled with the memory, wherein the processor, responsive to executing the instructions, performs operations comprising:
receiving a user profile associated with a portable electronic device via a local area network responsive to determining that the portable electronic device is in an area associated with the local area network;
providing communication services to a portable electronic device based on the user profile;
facilitating control, by the portable electronic device, of a controllable device associated with the server and coupled to the local area network;
identifying first advertisements to be presented by the controllable device based on monitored behavior for the portable electronic device;
detecting a response from the portable electronic device to a presentation of one of the first advertisements;
reanalyzing the monitored behavior in conjunction with the response to identify refined interests associated with the user; and
matching the refined interests to second advertisements to be presented by the controllable device;
presenting the second advertisements by way of the controllable device; and
terminating the communication services with the portable electronic device responsive to determining that the portable electronic device is outside the area associated with the local area network.

9. The server of claim 8, wherein the processor, responsive to executing the instructions, performs operations comprising:

provides other communication services between a second portable electronic device and the server via a second communication link between the second portable electronic device and the server, wherein the second communication link is established according to a second user profile associated with the second portable electronic device.

10. The server of claim 9, wherein the controllable device is controllable by the portable electronic device or by the second portable electronic device according to hierarchal user information obtained from the user profile or the second user profile.

11. The server of claim 8, wherein the user profile comprises one of digital rights information associated with the portable electronic device; digital rights information associated with the user; subscription information; digital video recorder information; hierarchical user information; control settings; or combinations thereof.

12. The server of claim 8, wherein the controllable device is one of a television or a stereo.

13. The server of claim 8, wherein the monitored behavior includes accessing websites via the portable electronic device.

14. A non-transitory computer-readable storage medium comprising instructions, which, responsive to being executed by a processor, cause the processor to perform operations comprising:

receiving a user profile associated with a portable electronic device via a local area network responsive to determining that the portable electronic device is in an area associated with the local area network;

facilitating control, by the portable electronic device, of a controllable device coupled to the local area network;

identifying first advertisements to be presented by the controllable device based on monitored behavior associated with the portable electronic device, wherein the controllable device operates within the local area network and is configured to be controlled via the portable electronic device;

providing communication services to the portable electronic device by way of the local area network based on the user profile;

identifying refined interests of the user by reanalyzing the monitored behavior in conjunction with a response from the portable electronic device to a presentation of one of the first advertisements;

matching the refined interests to second advertisements to be presented by the controllable device;

presenting the second advertisements by way of the controllable device; and terminating the communication services with the portable electronic device responsive to determining that the portable electronic device is outside the area associated with the local area network.

15. The non-transitory computer-readable storage medium of claim 14, wherein the processor, responsive to executing the instructions, performs operations comprising:

receiving a second user profile associated with a second portable electronic device;

providing other communication services to the second portable electronic device according to the second user profile.

16. The non-transitory computer-readable storage medium of claim 15, wherein the controllable device is controllable by the portable electronic device or by the second portable electronic device according to hierarchal user information obtained from the user profile or the second user profile.

17. The non-transitory computer-readable storage medium of claim 14, wherein the user profile comprising one of digital rights information associated with the portable electronic device; digital rights information associated with the user; subscription information; digital video recorder information; hierarchical user information; control settings; or combinations thereof.

18. The non-transitory computer-readable storage medium of claim 14, wherein the controllable device is one of a television or a stereo.

19. The non-transitory computer-readable storage medium of claim 14, wherein the monitored behavior includes accessing websites via the portable electronic device.

20. The non-transitory computer-readable storage medium of claim 14, wherein the monitored behavior includes recording of content.

* * * * *